(12) United States Patent
Lalsangi et al.

(10) Patent No.: US 7,600,035 B2
(45) Date of Patent: Oct. 6, 2009

(54) DYNAMIC LINK DISTANCE CONFIGURATION FOR EXTENDED FABRIC

(75) Inventors: Nagaraj Lalsangi, Pleasanton, CA (US); Balakrishma Wusirika, Pleasanton, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 1342 days.

(21) Appl. No.: 10/356,654

(22) Filed: Jan. 31, 2003

(65) Prior Publication Data

US 2004/0153566 A1    Aug. 5, 2004

(51) Int. Cl.
G06F 15/16    (2006.01)
G06F 15/173    (2006.01)

(52) U.S. Cl. .............. 709/234; 709/224; 370/234; 370/235; 370/236; 370/239

(58) Field of Classification Search ......... 709/234–235, 709/224; 370/234–236, 230, 239
See application file for complete search history.

(56) References Cited

U.S. PATENT DOCUMENTS

| | | | |
|---|---|---|---|
| 4,782,483 A | 11/1988 | Lambert et al. | |
| 5,383,181 A * | 1/1995 | Aramaki | 370/355 |
| 5,425,020 A | 6/1995 | Gregg et al. | |
| 5,455,831 A | 10/1995 | Bartow et al. | |
| 5,519,695 A * | 5/1996 | Purohit et al. | 370/352 |
| 5,649,108 A | 7/1997 | Spiegel et al. | |
| 6,016,310 A | 1/2000 | Muller et al. | |
| 6,031,842 A * | 2/2000 | Trevitt et al. | 370/412 |
| 6,104,696 A | 8/2000 | Kadambi et al. | |
| 6,233,236 B1 | 5/2001 | Nelson et al. | |
| 6,285,670 B1 | 9/2001 | Ghai et al. | |
| 6,400,681 B1 | 6/2002 | Bertin et al. | |
| 6,434,145 B1 | 8/2002 | Opsasnick et al. | |
| 6,614,236 B1 * | 9/2003 | Karam | 324/532 |
| 6,628,609 B2 | 9/2003 | Chapman et al. | |
| 6,647,017 B1 | 11/2003 | Heiman | |
| 6,647,019 B1 * | 11/2003 | McKeown et al. | 370/422 |
| 6,731,600 B1 * | 5/2004 | Patel et al. | 370/230 |
| 6,765,866 B1 * | 7/2004 | Wyatt | 370/229 |
| 6,785,286 B1 | 8/2004 | O'Keeffe et al. | |
| 7,085,846 B2 * | 8/2006 | Jenne et al. | 709/232 |
| 2002/0131456 A1 | 9/2002 | Lin et al. | |
| 2003/0048754 A1 * | 3/2003 | Bruckman | 370/252 |
| 2003/0227874 A1 * | 12/2003 | Wang | 370/236 |
| 2005/0030948 A1 | 2/2005 | Wyatt | |

OTHER PUBLICATIONS

Eberle, H., Oertli, E., "Switcherland: a QoS communication architecture for workstation clusters". Apr. 1998, ACM SIGARCH Computer Architecture News, Proceedings of the 25th annual international symposium on Computer architecture ISCA '98, vol. 26 Issue 3, pp. 98-108. [retreived from ACM database-Mar. 29, 2007].*

(Continued)

*Primary Examiner*—Ario Etienne
*Assistant Examiner*—Lashanya R Nash
(74) *Attorney, Agent, or Firm*—Wong, Cabello, Lutsch, Rutherford & Brucculeri LLP (57) ABSTRACT

A method to dynamically allocate credits for a particular port to port link based on measured link distance during the initial interswitch link configuration process. An apparatus implementing such method or a software upgrade to retrofit existing switches.

27 Claims, 4 Drawing Sheets

OTHER PUBLICATIONS

Kung, H., Blackwell, T.,Chapman, A.; "Credit-Based Flow Control for ATM Networks: Credit Update Protocol, Adaptive Credit Allocation, and Statistical Multiplexing"; SIGCOMM '94: Proceedings of the conference on Communications architectures, protocols and applications:Oct. 1994:pp. 101-114, [retrieved from ACM database Sep. 3, 2008].*

Tamir, Y., Frazier, G.L.; "Dynamically-allocated multi-queue buffers for VLSI communication switches", IEEE Transactions on Computers: Jun. 1992 vol. 41 , Issue: 6; pp. 725-737, [retrieved from IEEE database Sep. 3, 2008].*

Ocheltree, K.B.; Tsai, T.C.; Montalvo, R.; Leff, A.;"A comparison of fibre channel and 802 MAC services", Local Computer Networks, 1993., Proceedings., 18th Conference on; Sep. 19-22, 1993 pp. 238-246, [retrieved from IEEE database Sep. 3, 2008].*

"Fibre Channel—Generic Services-2 (FC-GS-2);" American National Standards Institute (Oct. 1999).

"Fibre Channel—Fabric Generic Requirements (FC-FG);" American National Standards Institute (Dec. 1996).

"Fibre Channel—Generic Services (FC-GS);" American National Standards Institute (Aug. 1996).

"Fibre Channel—Switch Fabric (FC-SW);" American National Standards Institute (Oct. 1997).

"Fibre Channel—Switch Fabric-2;" American National Standards Institute (Jun. 2001).

"Fibre Channel—Physical and Signalling Interface-3 (FC-PH3);" American National Standards Institute (Apr. 1998).

"Fibre Channel-13 Physical and Signalling Interface-2 (FC-PH-2);" American National Standards Institute (Mar. 1997).

"Fibre Channel—Physical and Signalling Interface (FC-PH);" American National Standards Institute (Jun. 1994).

"Fibre Channel—Arbitrated Loop (FC-AL);" American National Standards Institute (Apr. 1996).

* cited by examiner

DYNAMIC LINK DISTANCE CONFIGURATION FOR EXTENDED FABRIC

CROSS-REFERENCE TO RELATED APPLICATIONS

This application is related to and incorporates by reference, U.S. patent application Ser. No. 09/872,412, entitled "Link Trunking and Measuring Link Latency in Fibre Channel Fabric" by David C. Banks; Kreg A. Martin; Shunjia Yu; Jieming Zhu and Kevan K. Kwong, filed Jun. 01, 2001; Ser. No. 10/207,541 entitled "Credit Sharing for Fibre Channel Links with Multiple Virtual Channels" by Kreg A, Martin and David C. Banks, filed Jul. 29, 2002; Ser. No. 10/207,361 entitled "Cascade Credit Sharing for Fibre Channel Links" by Kreg A. Martin and Shahe H. Krakirian, filed Jul. 29, 2002; and Ser. No. 10/205,793 entitled "Method and Apparatus for Round trip Delay Measurement in a Bi-directional, Point-to-Point, Serial Data Channel" by Farid A. Yazdy and Kreg A. Martin, filed Jul. 26, 2002.

BACKGROUND OF THE INVENTION

1. Field of the Invention

This invention relates generally to network switching devices and more particularly to Fibre Channel switching devices and the dynamic credit allocation for a port based on the port-to-port link distance.

2. Description of the Related Art

The Fibre Channel family of standards (developed by the American National Standards Institute (ANSI)) defines a high speed communications interface for the transfer of large amounts of data between a variety of hardware systems such as personal computers, workstations, mainframes, supercomputers, storage devices and servers that have Fibre Channel interfaces. Use of Fibre Channel is proliferating in client/server applications which demand high bandwidth and low latency I/O such as mass storage, medical and scientific imaging, multimedia communication, transaction processing, distributed computing and distributed database processing applications. U.S. Pat. No. 6,160,813 to Banks et al. discloses one of the state of the art Fibre Channel switch systems, which is hereby incorporated by reference.

One or more interconnected switches form a network, called a fabric, which other devices, such as mass storage devices, servers or workstations, can be connected to. Any devices connecting to a fabric can communicate with any other devices connected to the fabric. A direct connection between two devices is a link. An interface on a device for connecting another device is a port. A non-switch device connecting to a fabric is a node on the network or fabric. A port on a non-switch and non-hub device is an N-port. A port on a switch may be an E-port, for connection to another switch port, an F-port, for connection to an N-port, an FL port for connection to an FC-AL loop or any combination of the above. A link between two switches is an inter-switch link (ISL).

Each port has a transmitter and a receiver. The transmitter sends out information and the receiver receives incoming information. There are buffer memories associated with each port, either the transmitter or the receiver, to temporarily store the information in transit, before the information is confirmed to be transmitted towards its destination by a switch, or to be stored or used by a device at its destination. The buffer memory can be in the actual port or, preferably, may be centralized, as shown in U.S. Pat. No. 6,160,813. The buffer memory is broken down into units. One unit of buffer memory, which can hold one frame, is represented by one buffer-to-buffer credit or one credit. A frame is a unit of information transmitted, which comprises a header portion and a payload portion. The header portion identifies the frame, including a Source Identification (SID) and a Destination Identification (DID). The payload portion contains the data being transmitted. A frame may be 2112 data bytes long, which, plus header, CRC, EOF totals 2148 bytes.

In the prior art, a receiver on a port is allocated a fixed amount of buffer space to temporarily store received frames, represented by a fixed number of buffer-to-buffer credits. The receiver controls the allocation of the buffer space. At the initial configuration when two switches connect, the receivers advertise to the transmitters the amount of buffer space represented by the number of credits available. The transmitters initialize their credit counters to the number of credits advertised by the receivers. Both the transmitting port and receiving port keep track of the use of the buffer space using the number of credits and credit counters. Each time a frame is received by the receiver, the frame is stored in a buffer space and the number of credits residing in the receiver is increased by one. The transmitting port keeps track of this by reducing its transmitter credit counter, which indicates how many more frames can be sent, while the receiver increments its receiver credit counter, which indicates how many frames are stored in the buffer space. Once the frame is confirmed to have been retransmitted by a transmitter on the receiving switch, or used by a device, then the buffer space is free to be used to store a new frame. At that time, a credit is returned by a transmitter on the receiving port to a receiver on the transmitting port and the receiver credit counter in the receiving port is decreased by one. When the transmitting port receives the credit, the transmitter credit counter in the transmitting port is increased by one.

Even though frames travel through the fiber optics at the speed of light, it still takes time for frames to move from one device to another. It also takes time for a device to receive a frame; process it or retransmit it; and then return a credit, i.e. a confirmation of receipt, back to the transmitting port. It takes some more time for the credit traveling through the optical fiber to reach the transmitting port. During the turnaround time between when the transmitting port sends out a frame and the transmitting port receives a credit, the transmitting port may have sent out a number of frames at its transmitting speed if the transmitting port has available credits. When the transmitting port has at least a minimum number of credits to allow the transmitting port to continue transmitting until it receives credits back from the receiving port, the effective frame transmission rate is the highest. If the transmitting port does not have that minimum number of credits, then it has to temporarily stop sending frames when all the credits are used and wait until the credits return. Due to this stoppage, the effective frame transmission rate may be substantially lower than the actual transmission rate. That minimum number of credits depends on the turn-around time and the frame transmitting speed. The longer the transmission line, or the faster the transmitting speed, the more frames that may be in transit. At a fixed transmitter speed, the more credits a port can have, the longer the transmission distance can be while the link still maintains the full effective transmitter speed.

In the prior art, the number of credits allocated to a port is fixed, but the distance between ports may be different. For long distant links, there may not be enough credits to sustain the full speed of the transmitters. For shorter distance links, there may be more credits than necessary such that some of the buffer space or credits are wasted. Even for Fibre Channel switches where the buffer memory are centrally allocated and controlled, the amount of credits or buffer space allocated to each port is still fixed. To alleviate such problem, in some other prior art Fibre Channel switches, an installer of the physical port to port link may manually configure the buffer space dedicated for a particular port depending on the distance between the port to port link. There may be discreet distant levels that an installer can select, such as 5, 10, 50, 100 kilometers. Still many times these levels are too far higher than the actual link distance deployed by the Fibre Channel network installer. For a given configuration, a particular distance level setting may be wasteful because it will overcommit the buffer credits based on next higher level. With the advancing in the speed of Fibre Channel switches and the distance of the Fibre Channel links, the demand for buffer space or credits is increasing. The inflexibility of buffer space or credits allocation becomes increasingly costly.

Therefore, it is desirable to have a method to match the credit demand for a port connecting to a port to port link to the available credits on a Fibre Channel switch. It is also desirable to have devices to implement such a method.

BRIEF SUMMARY OF THE INVENTION

The present invention utilizes a dynamic link distance configuration to allocate credits for a particular port to port link. During the initial interswitch link configuration process, the actual distance between the two connecting port is measured and the demand for credits is calculated. Such amount of credits is allocated to this link. The present invention can be implemented in the hardware of a Fibre Channel switch itself or as software upgrades to retrofit existing Fibre Channel switches, assuming the switch includes the link timer hardware.

BRIEF DESCRIPTION OF THE DRAWINGS

A better understanding of the invention can be had when the following detailed description of the preferred embodiments is considered in conjunction with the following drawings, in which.

DETAILED DESCRIPTION OF THE PREFERRED EMBODIMENT

Figure 1:
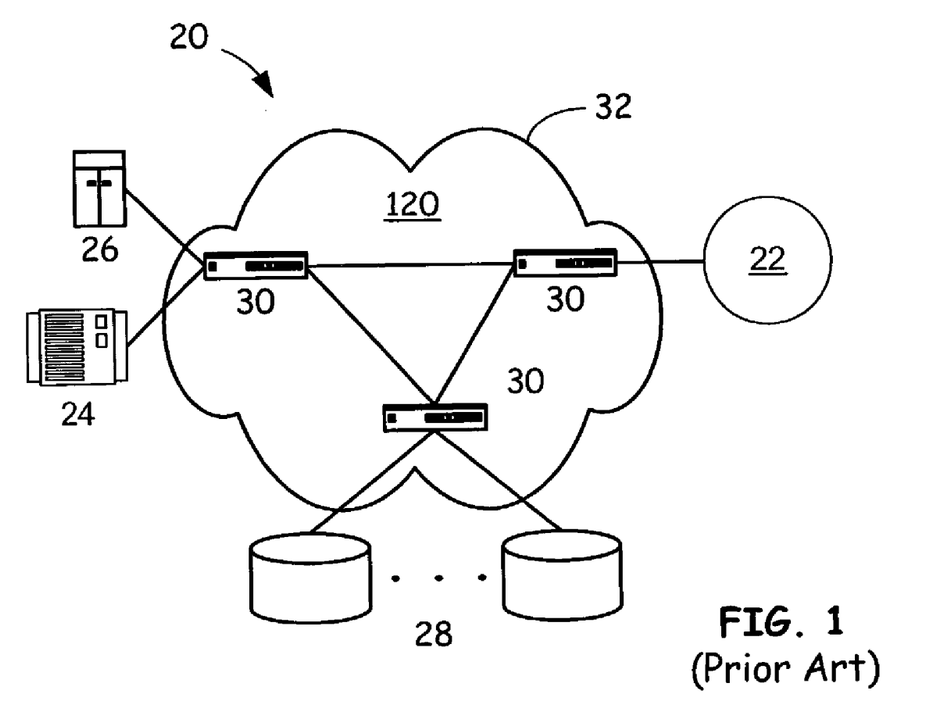
FIG. 1 is a block diagram of a typical fabric with connecting devices.

FIG. 1 depicts a typical Storage Area Network (SAN) 20 utilizing a Fibre Channel network. A fabric 32 may comprise one or more switches 30. Three switches 30 are shown. Many devices or nodes, such as a general storage device 24, a server 26, database storage devices 28 and a loop 22 (itself comprised of devices, not shown) are connected to the fabric 32. Any devices on the fabric 32 can communicate to any other devices on the fabric 32.

Figure 2:
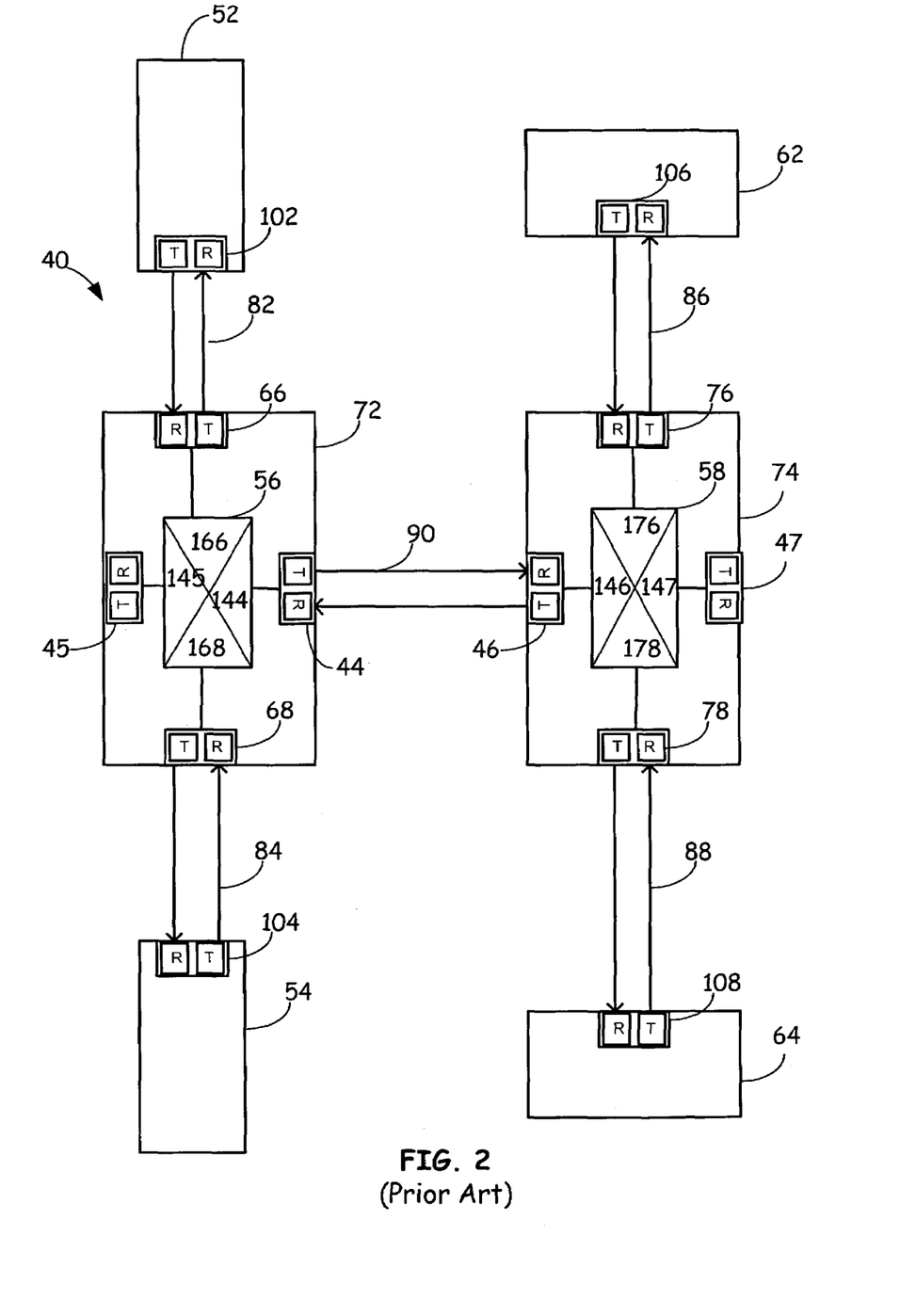
FIG. 2 is a block diagram of a two switch, four device network showing the interconnections, where the buffer memory for each port is centrally allocated and controlled on the switches.

FIG. 2 is a block diagram showing more details of several particular interconnections in a portion of a SAN 40. Two switches 72 and 74 are shown, together with two servers 52, 54 and two storage devices 62, 64. The N-ports 102, 104, 106 and 108 on servers 52 and 54, and storage devices 62 and 64, and their corresponding F-ports 66, 68, 76 and 78 on the switches 72 and 74 are linked by links 82, 84, 86 and 88. The two switches 72 and 74 have one E-port each, 44 and 46, which are connected through ISL 90. Each switch may also have a central memory 56 and 58 in switches 72 and 74, for buffering information in transit and a control module (not shown) for managing the information flow, such as directing flows of information and managing the buffer space. Each port has a transmitter (T) and a receiver (R). The available buffer spaces in the central memory are allocated among the ports on the switch.

The available buffer space for each port can reside on the individual port or can reside centrally in the switch. Either way, the buffer space allocated to each port on the switch is fixed at a single amount by the switch manufacturer or at very few discreet levels that can be selected by the installer. In FIG. 2, each port 44, 66, 45, and 68 on switch 72 are allocated one quarter of the central memory 56. Buffer memory 144, 166, 145 and 168 are dedicated to port 44, 66, 45, and 68. Similarly, a quarter of the central buffer space 58, i.e., 147, 176, 146 and 178 are allocated to port 47, 76, 46, and 78 on switch 74. Buffer space 145 and 147 which are allocated to port 45 and 47 are wasted because neither of those two ports is in use in this network.

Figure 3:
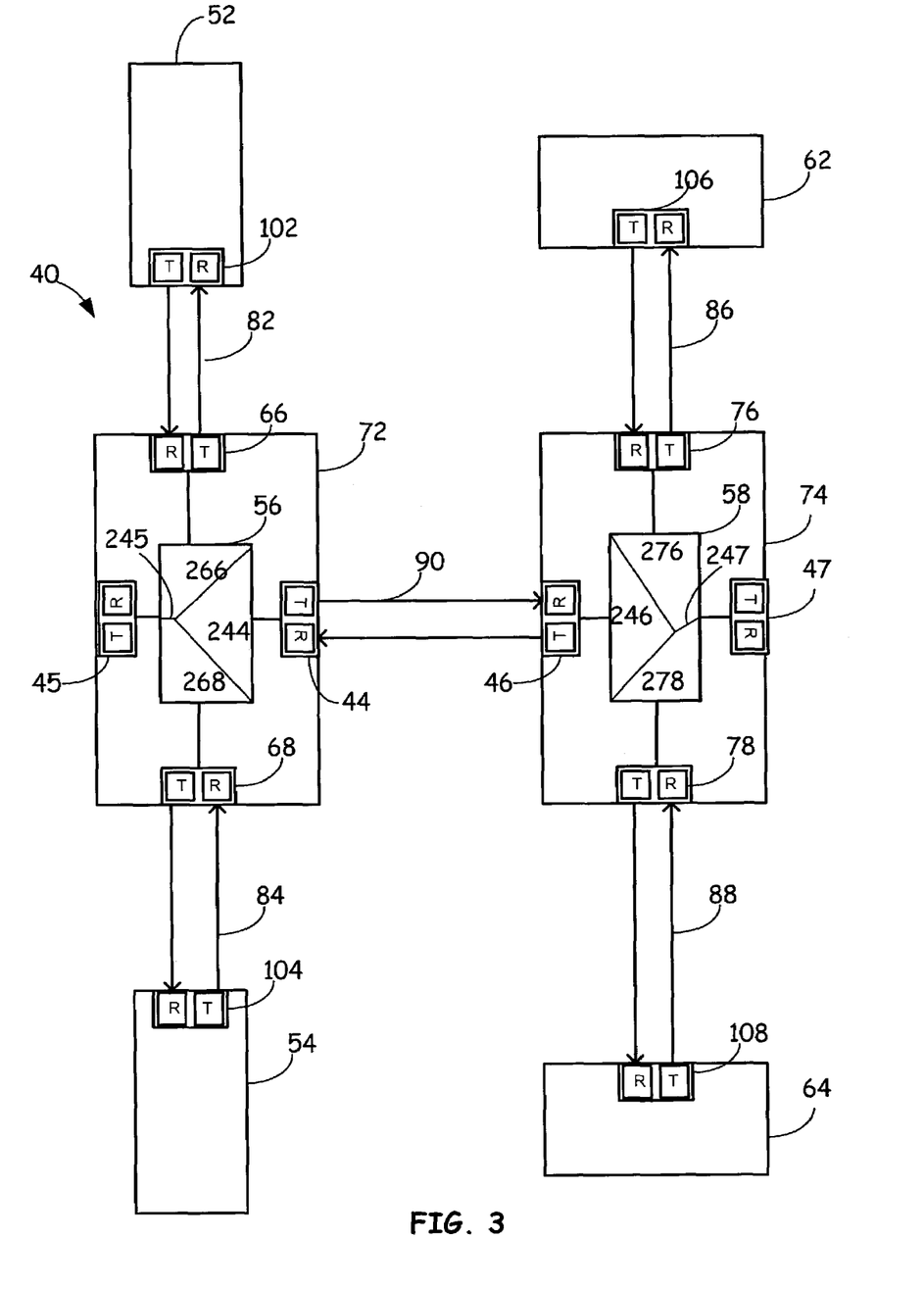
FIG. 3 is a block diagram of a two switch, four device network showing the interconnections similar to the ones shown in FIG. 2, except that the buffer memory allocated to each port is dynamically allocated during the initial port to port configuration.

FIG. 3 shows the same network configuration as in FIG. 2 except the buffer space allocations for the ports have changed. In this embodiment of the present invention, the allocation of buffer space to the ports is allocated dynamically based on the actual distance between the ports. The port 45 on switch 72 and port 47 on switch 74 are not in use, therefore, those two ports are not allocated any buffer space. The link between ports 44 and 46 is longer and also the demand for credits is more between those two ports, therefore the buffer space allocated to these two ports on each switch is bigger. The buffer spaces 244, 266, 245 and 268 allocated to ports 44, 66, 45, and 68 on switch 72 are different and are based on the needs for each port. The buffer space 245 allocated to port 45 is at its minimum. Similarly, buffer spaces 246, 276, 247, and 278 allocated to ports 46, 76, 47, and 78 on switch 74 are of various sizes, and buffer space 245 is at its minimum. The actual determination of the buffer space or credit for each port will be described later.

Figure 4:
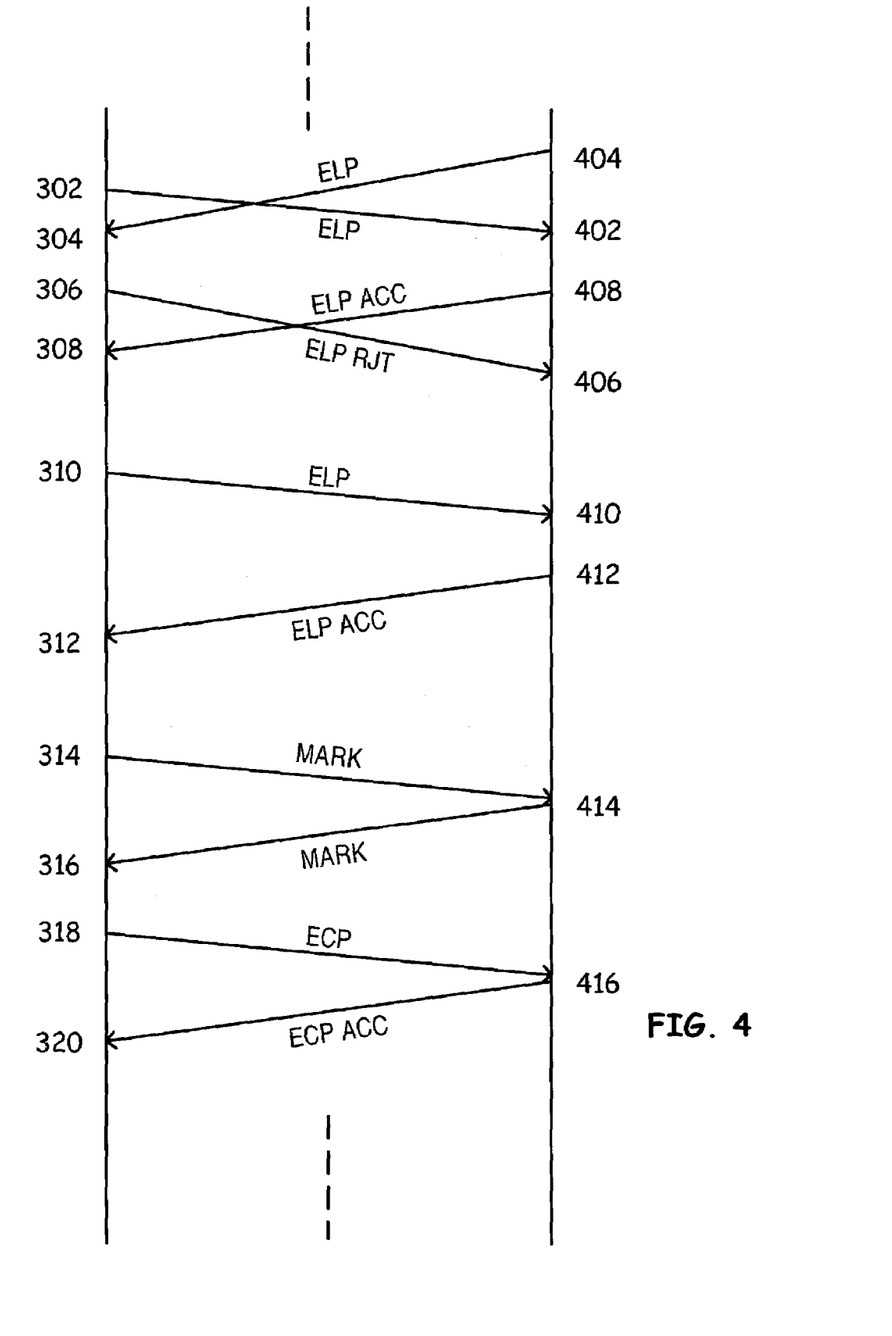
FIG. 4 shows a portion of the port to port initial configuration, where the distance between the ports is measured and the amount of necessary credits is determined.

FIG. 4 shows a portion of the initial configuration that measures the distance between the two ports and determines the amount of credits or buffer space needed for the link. The direction from top to bottom on FIG. 4 is the direction of time. As shown in FIG. 4, there may be other processes before and after the measurement of distance and the determination of the credit need during the initial configuration process. When port 44 and port 46 physically connect, the initial configuration starts. After the initial device identification and some other configuration, the measurement of the distance between the two ports and buffer space determination can begin. Each port on any devices on a Fibre Channel network has its own unique identification. In this case, the world-wide number (WWN) may be used as such device identification. At the initial device identification, WWN of each port is exchanged.

Continue referring FIG. 4, at time point 302, switch 72 uses port 44 to send an ELP or Extended Link Parameters 1LS packet to port 46 of switch 74. At the earlier or later time 404, switch 74 may use port 46 to also send an ELP packet to port 44. This packet is to determine which port has a higher WWN, and may be used to determine which port will act as the initiator port or target port. An initiator port is the port that measures and determines the distance and buffer space for the link. A target port returns signals coming from the initiator port, but itself does not determine the link distance or the credit demand. It is immaterial which port acts as the initiator port or the target port, so long the two ports agree to the roles they play in the distance measurement. In the preferred embodiment, the ports use WWN to determine which one is the initiator port. In the preferred embodiment, the initiator port is the port having the higher WWN during the port initialization and the target port is the port with the lower WWN during the port initialization. In the example shown in FIG. 4, port 44 has a higher WWN than port 46, so port 44 is the initiator port and port 46 is the target port in this connection.

The next several exchanges of signals confirm that port 44 has a higher WWN then port 46. At time 304, port 44 receives the ELP packet from port 46 and at time 306 switch 72 sends out an ELPRJT or ELP Reject packet back to port 46 which receives the ELPRJT at time 406, meaning "port 46 has a lower WWN than port 44." Similarly, port 46 at time 402 receives the ELP packet from port 44 and switch 74 responds at time 408 an ELPACC or ELP Accept packet back to port 44, which receives the ELPACC packet at time 308, meaning "port 44 has a higher WWN than port 46."

A port on a switch which supports dynamically allocating the amount of credits for the port is referred to as supporting the LD mode of operation. For a port to port to operate in the LD mode, both ports on the link must support the LD mode, i.e. participate in the distance measurement and credits determination. It is not essential to make the inquiry, but the inquiry makes sure that the time/distance measurement can be used. So one of the ports inquires of the other port and confirms that both ports support the LD mode and both are using the same protocol in carrying out the distance measurement and credit determination. This is illustrated in the next few exchanges of signals in FIG. 4. Switch 72 uses port 44 at time 310 to send an ELP packet to port 46 to inquire of port 46 whether port 46 would support the LD mode, which is the dynamic long distance configuration mode. At time 410, port 46 receives the ELP packet and at time 412 switch 74 responds with an ELPACC packet back to port 44, which port 44 receives at time 312. The ELPACC packet confirms that port 46 supports the LD mode. In the preferred embodiment, as indicated earlier, WWN is used to determine the initiator/target ports and that the port having the higher WWN is the initiator port. It is obvious that any identifiers that may be used in place of WWN and any unique sequence, such as numerical or alphabetical may be used to determine which port is the initiator port and which port is the target port. Once ELP and ELPACC packets are exchanged, both ports know that they will follow the same protocol, i.e. LD mode, to measure the distance and each one knows the exact action it will take under the protocol.

After port 46 responds with the ELPACC packet, it is ready to return the next packet from port 44, which will be a Mark primitive, a unique packet used to measure time elapsed in the link. Return here means that port 46 will respond to a packet coming from port 44 immediately after port 46 receives the signal without any processing in the port 46. The Mark primitive is essentially a light pulse and port 46 is acting as a mirror. The port 44 emits a light pulse (Mark primitive). The light pulse (Mark primitive) is returned or reflected by port 46 and received by port 44. Once port 44 receives the ELPACC packet at time 312, the switch 72 knows that port 46 supports the LD mode and it is ready to do the distance measurement.

The above preparatory steps are useful and are implemented in some embodiments of the current invention, but they are not essential.

In the following steps, time/distance is measured. At time 314, switch 72 uses port 44 to send out the Mark primitive to port 46 and at the same time starts a timer to measure the time elapsed between now and when the Mark primitive return packet comes back from port 46. Port 46 will receive the Mark primitive at time 414 and immediately return it back to port 44 (i.e. reflect the light pulse back). The port 44 receives the Mark primitive at time 316 and stops the timer immediately. The time difference between time 316 and 314 is the time that the Mark primitive takes to travel a round trip between the two ports 44 and 46. The packet is traveling at a substantially known portion of the speed of light in the link so the distance can be calculated by multiplying the time period between time 316 and 314 by the speed of light in the fabric and other values. By time 320, the distance is determined and the number of buffer credits can be determined by a formula depending on the distance.

The link distance can be calculated as follows:

$$\text{DISTANCE} = (LRT\_\text{LATENCY} * 3)/(20 * RI) \quad \text{Eq.(1)}$$

Where DISTANCE is the link distance in km;

LRT_LATENCY is the time lapse between time 316 and 314, in microseconds

RI is the refractive index of glass (worst case)

For a given link distance, buffer credits required are about 1 per km for 2 Gbit/sec links and 0.5 per km for 1 Gbit/sec links, approximately based on the equation below:

$$\text{Number of credits} = ((20 * RI * \text{DISTANCE})/3) * (100/\text{MAX\_FRAME\_SIZE}) * \text{LINE\_RATE} + 2 \quad \text{Eq. (2)}$$

Where MAX_FRAME_SIZE is the max frame size in FC, usually 2148 bytes

LINE_RATE is the raw data rate of link, in Gb/s.

The extra 2 credits in Eq.(2) are the usual amount of credit allowance for the latency within a switch for processing a signal/frame and/or other delays. The latency within a switch is the time between a port receiving a frame/signal, processing it, and responding or retransmitting the frame/signal. This latency within a switch is switch dependent and could be different for different switches.

When distance information is not needed, Eq.(1) and Eq.(2) can be combined to get the direct relationship between time latency and the desired amount of credits:

$$\text{Number of credits} = (LRT\_\text{LATENCY} * \text{LINE\_RATE} * 100)/\text{MAX\_FRAME\_SIZE} + 2 \quad \text{Eq.(3)}$$

LRT_LATENCY is the time lapse between timer stops and starts, in microsecond

LINE_RATE is the raw data rate of the link in Gb/sec,

MAX_FRAME_SIZE is the maximum size of a frame transmitted by the ports, usually 2148 bytes.

In one of the embodiments, the timer is a counter, counting at a rate of about 106.25 MHz. The maximum value of the counter is 524287 (0x 7ffff). The time-out is triggered when the timer/counter exceeds 524287, or about 5 ms. When a time-out occurs, a message is generated indicating that the current measurement has failed. Generally another attempt is made under such conditions until a pre-determined number of attempts have been made, at which time a message is generated indicating failure of the measurement process. Table 1 shows the typical link latency and corresponding distance and buffer credit allocation.

TABLE 1

| Link round trip latency (micro second) | Link distance (km) | Buffer credits (# of frames) 2G link | Buffer credits (# of frames) 1G link |
| --- | --- | --- | --- |
| 1000 | 100 | 100 | 50 |
| 800 | 80 | 80 | 40 |
| 600 | 60 | 60 | 30 |
| 400 | 40 | 40 | 20 |
| 200 | 20 | 20 | 10 |
| 100 | 10 | 10 | 5 |

The number of credits according to Eq.(2) is the desired amount of credits for a port at distance. In the case that there are not enough credits on the switch to satisfy the demands from all ports, then only a portion of the demand for some ports can be satisfied. There are various ways to pick and choose, i.e. priority schemes. One priority scheme can be the first serve scheme: the available credits are used to satisfy the first connected port. The left over credits will be used to satisfy the demand of next connected port, and so on until all the credits are allocated. Then the remaining ports on the switch are no longer useable, i.e. cannot be used to connect to other ports. Another priority scheme can be an even distribution scheme: when the total demand for credits from all connected ports is more than the total available credits, then the same percentage of demanded credits is allocated (satisfied) for all ports, so that the total allocated credits is equal to the total available credits. This way, all the ports on a switch are useable, albeit at a lower effective speed due to the lack of credits. A formula for performing this even distribution scheme is:

$$Nai=Ni*(\text{Total number of credits on switch})/\text{sum} (\text{Number of credits of all ports}),$$

where Nai is the amount of credits reallocated to port i,
Ni is the amount of credits allocated to port i by the equation above, and
Sum (number of credits of all ports) is the sum of credits allocated to all ports as in the equation above.

After the switch 72 has determined the number of credits needed for the link 90, the switch 72 uses port 44 to send an ECP or Extended Credit Parameters ILS packet to port 46 at time 318. This is a new ILS, which is preferred over using an ELP to allow simplified ELP processing, but an ELP can be used if desired. The ECP packet contains the needed credit information so that switch 74 can set up port 46 like switch 72 will set up port 44. The switch 74 replies with an ECPACC or ECP Accept packet at time 416 to indicate that the credit information will be used to set up port 46. When switch 72 receives the ECPACC packet at time 320 at port 44, the credit information is applied to port 44. If the switch 74 replies with an ECPRJT or ECP Reject packet, the credit information is not applied to either port 44 or port 46, but the credit allocation is determined by other means.

After the ECP packet handshake, the remaining configuration operations occur.

The present invention may be implemented in many ways. For example, the present invention may be implemented in a software format, as a machine readable, machine executable program. The software program executing the present invention can be loaded into a processor or control module on a switch, or a buffer credit management module on a switch, during a power up initialization or a later set-up. This presumes that the hardware portions of the buffer credit logic are sufficiently programmable or are made sufficiently programmable to handle the changing credit allocations.

The present invention may also be implemented in hardware format, as a new switch having the new credit sharing scheme built into the hardware.

While illustrative embodiments of the invention have been illustrated and described, it will be appreciated that various changes can be made therein without departing from the spirit and scope of the invention.

Titles and subtitles used in the text are intended only as focal points and an organization tool. These titles are not intended to specifically describe the applicable discussion or imply any limitation of that discussion.

We claim:

1. A method to dynamically allocate credits to a port in a Fibre Channel network, the method comprising:
   connecting a first port on a first device to a second port on a second device to form a link;
   the first port sending a unique signal to a second port and starting a timer;
   the first port receiving the unique signal returned from the second port and stopping the timer; and
   allocating credits according to the time elapsed on the timer,
   wherein allocating credits according to the time elapsed on the timer includes:
      calculating the distance according to the time elapsed on the timer; and
      allocating credits corresponding to the distance between the first and second ports, and
   wherein calculating the distance according to the time elapsed on the timer uses the following formula:

$$\text{distance}=(LRT\_LATENCY*3)/(20*RI) \qquad \text{Eq.(1)}$$

where distance is the link distance in km;
   LRT_LATENCY is the time lapse between timer stops and starts, in microseconds and
   RI is the refractive index of glass (worst case) in the fiber optic connecting the two ports.

2. The method in claim 1, wherein the timer has a time-out limit, and
   wherein when the timer reaches the time-out limit before receiving the unique signal returned from the second port, the timer is stopped and a message is generated.

3. The method in claim 1, further comprising:
   the first device inquiring of the second device whether the second port supports a mode to dynamically allocate credits; and
   the second device responding to the first device that the second port supports the mode to dynamically allocate credits.

4. The method in claim 1, further comprising:
   the first port and the second port exchanging identities wherein the identities follows a defined sequence, and
   wherein the first port identity is in front of the second port identity in the sequence.

5. The method in claim 1,
   wherein the link has a LINE_RATE, the raw data rate of the link in Gb/sec and the frames transmitted has a MAX_FRAME_SIZE which is the maximum size of a frame transmitted by the ports; and
   wherein allocating credits corresponding to the distance for one of the first and second ports, the amount of credit allocated is determined by the following formula:

$$\text{Number of credits}=((20*RI*\text{DISTANCE})/3)*(100/\text{MAX\_FRAME\_SIZE})*\text{LINE\_RATE}+K,$$

where K is a constant provided to allow for intraswitch latencies.

6. The method in claim 5, wherein the first device having the first port has one or more other ports, and the credits available on the first device are allocated to connected ports on a first come, first serve basis until all credits are used.

7. The method in claim 5, wherein the first device having the first port has one or more other ports, further comprising:
allocating the amount of credits to each port, such that:
Nai=Ni*(Total number of credits on switch)/sum (Number of credits of all ports),
where Nai is the amount of credits reallocated to port i,
Ni is the amount of credits allocated to port i in claim 5, and
Sum (number of credits of all ports) is the sum of credits allocated to all ports as in claim 5.

8. A device for use in a Fibre Channel network, comprising:
a Fibre Channel port for connection to another Fibre Channel port,
a timer coupled to the Fibre Channel port, and
a control module coupled to the Fibre Channel port and the timer, wherein the control module is operable to send and receive a unique signal through the Fibre Channel port,
wherein the control module is operable to tell the time elapsed between sending the unique signal and receiving the unique signal, using the timer,
wherein the control module is operable to allocate a number of credits based on the time elapsed between sending the unique signal and receiving the unique signal, and
wherein the number of credits allocated is determined by formula:

Number of credits=
(LRT_LATENCY*LINE_RATE*100)/MAX_FRAME_SIZE+K, where LRT_LATENCY is the time lapse between timer stops and starts, in microseconds,
LINE_RATE is the raw data rate of the link in Gb/sec,
MAX_FRAME_SIZE is the maximum size of a frame transmitted by the ports, and
K is a constant provided to allow for intradevice latencies.

9. The device in claim 8,
wherein the timer has a time-out limit, and
wherein when the timer reaches the time-out limit, the control module will generate a message.

10. The device in claim 8, wherein the control module is further operable to send an inquiry and to receive a response whether the other Fibre Channel port connected to the Fibre Channel port supports a mode to dynamically allocate credits.

11. A Fibre Channel switch for an information network, said switch comprising:
a first Fibre Channel port and a second Fibre Channel port, the first port for connection to another Fibre Channel port and the second port for connection to another Fibre Channel port;
a memory;
a timer coupled to the first port; and
a control module coupled to the first port and the timer, wherein the control module is operable to send and receive a unique signal through the first port,
wherein the control module is operable to tell the time elapsed between sending the unique signal and receiving the unique signal, using the timer,
wherein the control module is operable to allocate a number of credits to the first port based on the time elapsed between sending and receiving the unique signal, and wherein the number of credits allocated is determined by formula:

Number of credits=
(LRT_LATENCY*LINE_RATE*100)/MAX_FRAME_SIZE+K, where LRT_LATENCY is the time lapse between timer stops and starts, in microseconds,
LINE_RATE is the raw data rate of the link in Gb/sec,
MAX_FRAME_SIZE is the maximum size of a frame transmitted by the ports, and
K is a constant provided to allow for intradevice latencies.

12. The Fibre Channel switch in claim 11,
wherein the second port is operable to receive and return a unique signal.

13. The Fibre Channel switch in claim 11,
wherein the timer has a time-out limit, and
wherein when the timer reaches the time-out limit, the control module will generate a message.

14. The Fibre Channel switch in claim 11, wherein the control module is further operable to send an inquiry and to receive a response whether another Fibre Channel port connected to the first port supports a mode to dynamically allocate credits.

15. The Fibre Channel switch in claim 11, wherein the control module is further operable to receive an inquiry from and to send a response to another Fibre Channel port connected to the second port confirming that the second port supports a mode to dynamically allocate credits, and
wherein the control module is operable to allocate a number of credits to the second port based on a command received at the second port.

16. The Fibre Channel switch in claim 11, wherein the control module is operable to allocate the credits available on the switch to connected ports on a first come first serve basis until all credits are used.

17. The Fibre Channel switch in claim 11, wherein the control module is operable to allocate the amount of credits to each port, such that:

Nai=Ni*(Total number of credits on switch)/sum (Number of credits of all ports), where Nai is the amount of credits reallocated to port i,
Ni is the amount of credits allocated to port i in claim 11, and
Sum (number of credits of all ports) is the sum of credits allocated to all ports as in claim 11.

18. A Fibre Channel network comprising:
a first switch including:
a first port;
a timer; and
a first control module coupled to the first port and the timer; and,
a second switch including:
a second port connected to the first port on the first switch, and
a second control module,
wherein the first control module is operable to send and receive a unique signal through the first port,
wherein the first control module is operable to tell the time elapsed between sending the unique signal and receiving the unique signal, using the timer,
wherein the first control module is operable to allocate a number of credits to the first port based on the time elapsed between sending and receiving the unique signal;
wherein the second port is operable to receive and return the unique signal, and wherein the number of credits allocated is determined by formula:

Number of credits= ($LRT$_LATENCY*LINE_RATE*100)/MAX_FRAME_SIZE+$K$, where LRT_LATENCY is the time lapse between timer stops and starts, in microseconds,
LINE_RATE is the raw data rate of the link in Gb/sec,
MAX_FRAME_SIZE is the maximum size of a frame transmitted by the ports, and
K is a constant provided to allow for intraswitch latencies.

19. The Fibre Channel network in claim 18,
wherein the timer has a time-out limit, and
wherein when the timer reaches the time-out limit, the first control module will generate a message.

20. The Fibre Channel network in claim 18,
wherein the first control module through the first port, is further operable to send an inquiry to and receive a response from the second port whether the second port supports a mode to dynamically allocate credits, and
wherein the second control module through the second port, is further operable to receive the inquiry from and send the response to the first port whether the second port supports a mode to dynamically allocate credits.

21. The Fibre Channel network in claim 18, wherein the first control module is operable to allocate the credits available on the switch to connected ports on a first come first serve basis until all credits are used.

22. The Fibre Channel network in claim 18, wherein the control module is operable allocate the amount of credits to each port, such that:

Nai=Ni*(Total number of credits on switch)/sum (Number of credits of all ports), where Nai is the amount of credits reallocated to port i,
Ni is the amount of credits allocated to port i in claim 18, and
Sum (number of credits of all ports) is the sum of credits allocated to all ports as in claim 18.

23. A Fibre Channel network system comprising:
a first node;
a second node;
a first switch including:
  a first port;
  a third port coupled to the first node;
  a timer; and
  a first control module coupled to the first port and the timer,
a second switch including;
  a second port connected to the first port on the first switch;
  a fourth port coupled to the second node; and
  a second control module,
wherein the first control module is operable to send and receive a unique signal through the first port,
wherein the first control module is operable to tell the time elapsed between sending the unique signal and receiving the unique signal, using the timer,
wherein the first control module is operable to allocate a number of credits to the first port based on the time elapsed between sending and receiving the unique signal,
wherein the second port is operable to receive and return the unique signal, and
wherein the number of credits allocated is determined by formula:

Number of credits= ($LRT$_LATENCY*LINE_RATE*100)/MAX_FRAME_SIZE+$K$ where LRT_LATENCY is the time lapse between timer stops and starts, in microseconds,
LINE_RATE is the raw data rate of the link in Gb/see,
MAX_FRAME_SIZE is the maximum size of a frame transmitted by the ports, and
K is a constant provided to allow for intraswitch latencies.

24. The Fibre Channel network system in claim 23,
wherein the timer has a time-out limit, and
wherein when the timer reaches the time-out limit, the first control module will generate a message.

25. The Fibre Channel network system in claim 23,
wherein the first control module through the first port, is further operable to send an inquiry to and receive a response from the second port whether the second port supports a mode to dynamically allocate credits, and
wherein the second control module through the second port, is further operable to receive the inquiry from and send the response to the first port whether the second port supports a mode to dynamically allocate credits.

26. The Fibre Channel network system in claim 23, wherein the first control module is operable to allocate the credits available on the switch to connected ports on a first come first serve basis until all credits are used.

27. The Fibre Channel network system in claim 23, wherein the control module is operable reallocate the amount of credits to each port, such that:

Nai=Ni*(Total number of credits on switch)/sum (Number of credits of all ports), where Nai is the amount of credits reallocated to port i,
Ni is the amount of credits allocated to port i in claim 23, and
Sum (number of credits of all ports) is the sum of credits allocated to all ports as in claim 23.

* * * * *

UNITED STATES PATENT AND TRADEMARK OFFICE
CERTIFICATE OF CORRECTION

PATENT NO. : 7,600,035 B2
APPLICATION NO. : 10/356654
DATED : October 6, 2009
INVENTOR(S) : Lalsangi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2013 days.

Signed and Sealed this

Fifth Day of October, 2010

David J. Kappos
*Director of the United States Patent and Trademark Office*

UNITED STATES PATENT AND TRADEMARK OFFICE
CERTIFICATE OF CORRECTION

PATENT NO. : 7,600,035 B2
APPLICATION NO. : 10/356654
DATED : October 6, 2009
INVENTOR(S) : Nagaraj Lalsangi and Balakrishna Wusirika It is certified that error appears in the above-identified patent and that said Letters Patent is hereby corrected as shown below:

On the Title Page, item (75);

Inventor: "Balakrishma Wusirika" should read "Balakrishna Wusirika."

Signed and Sealed this
Twelfth Day of April, 2011

David J. Kappos
*Director of the United States Patent and Trademark Office*